Nov. 13, 1962

M. SAMS ETAL 3,064,227

ELECTRICAL TERMINAL

Filed Sept. 17, 1957

INVENTORS
MARTIN SAMS
HERMAN FELDMAN
BY
James and Franklin
ATTORNEYS

INVENTORS.
MARTIN SAMS
HERMAN FELDMAN

Nov. 13, 1962  M. SAMS ETAL  3,064,227
ELECTRICAL TERMINAL
Filed Sept. 17, 1957  4 Sheets-Sheet 4

INVENTOR
MARTIN SAMS
HERMAN FELDMAN
BY
ATTORNEY

United States Patent Office 3,064,227
Patented Nov. 13, 1962

3,064,227
ELECTRICAL TERMINAL
Martin Sams, 7635 Byron Ave., Miami Beach 41, Fla., and Herman Feldman, 9117 Carlyle Ave., Surfside 54, Fla.
Filed Sept. 17, 1957, Ser. No. 684,544
12 Claims. (Cl. 339—95)

The present invention relates to electric terminals, and more particularly to that part thereof which receives and makes electrical connection with an external lead. It relates more specifically to a mode of construction which facilitates the securing of the wire in place and the attainment of electrical connection thereto.

The terminal of the present invention is especially adapted for use with stiff core (i.e. solid core and stiff cable-like stranded core) insulated wire, but is not necessarily limited to use therewith. In the past it has usually been deemed necessary, before such a stiff core wire or, indeed, almost any wire, could be connected to a terminal, that the insulation be stripped therefrom so as to bare an appropriate portion thereof. There are, of course, certain obvious drawbacks to this procedure. It is usually very time consuming, because the insulation is comparatively tough and resists tearing. It requires an appreciable degree of skill if the wire is not to be damaged by the stripping operation. And even if the wire is not damaged appreciably it is very likely to become nicked or scarred. This is undesirable because it involves the removal of some of the conducting material from the wire and because it sets up fault lines in the wire which may cause mechanical failure, particularly in a core which is subject to vibration. In order to obviate these difficulties various tools have been designed for stripping the insulation from the wire. Not only are these tools often expensive and relatively heavy, but unless great care is exercised in their use they will cut rings on the wire thus setting up the aforementioned fault lines, and the wire will therefore be subject to breakage.

Despite these disadvantages, insulation stripping is a prerequisite to the use of the terminals for stiff core wires presently available. (The only exception to this statement are those terminals where the insulation and core are actually cut into and penetrated, but such terminals have a fairly limited range of applicability.) A prime characteristic of the terminals of the present invention, however, resides in the fact that, while they can be used with stripped wire if desired, they are particularly effective with unstripped wire, thus eliminating the necessity that insulation be stripped from the wire in a separate operation. Instead the terminal of the present invention, according to one important aspect thereof, is so constructed that when the insulated wire is inserted into the terminal a firm, effective and permanent electrical connection will be accomplished merely by the act of insertion.

The terminals of the present invention will make at least as good an electrical connection as conventional terminals, and usually a better one, they can be used for more than one gauge of wire if desired, and they are competitive in both physical size and cost with corresponding conventional terminals.

The terminals of the present invention incorporate two novel modes of operation, which when used together and in combination, provide for exceptionally effective functioning. These two modes of operation relate respectively to causing the core of the unstripped wire to protrude from its insulation sheath and to using a prong interposed between the core and sheath for various purposes.

We have observed that stiff core insulated electric wire of the type available on the market today has an insulation sheath which is easily compressible and which slides rather freely along the core, this latter characteristic being expressly designed to facilitate the stripping of the insulation from the wire. In accordance with our invention this latter characteristic is utilized, in conjunction with the compressibility characteristic of the insulation, to cause the bare core to protrude from the insulation sheath when the insulated wire is inserted into the terminal. The terminal is provided with means adapted, as the covered wire is inserted into the terminal, to engage the insulation sheath but leave the wire core relatively free to move. When the wire is pushed further into the terminal the restraint exerted substantially only on the sheath will cause the core to protrude from the sheath at the end of the wire. Means are provided to hold the wire in position and to make electrical connection with the protruding core portion. Thus electrical connection is made merely by the act of inserting an insulated wire into the terminal, and without having to remove any of the insulation therefrom.

We have also discovered that it is exceedingly easy to cause a prong, or, as we prefer to call it a, "sword," to enter the wire endwise between the conductive core and the insulation sheath, the resiliency of the sheath serving to firmly hold the sword against the core and, moreover, facilitating the insertion of the sword into place. Moreover, a sword slipped under the sheath in this manner may also serve as the means for restraining axial movement of the sheath while permitting axial movement of the core, thus itself providing for protrusion of the bare core from the insulation sheath. By properly mounting the sword in conjunction with the other elements of the terminal, a commercial terminal can be produced which is not only can be used effectively with several different wire gauges but which will also, for any given gauge, achieve a connection which is both mechanically and electrically superior to that attained by prior competitive terminals.

When a sword is not used to cause protrusion of the bare core, and where, as is believed to be preferable, the wire is held in place by an element which engages the bared core, certain problems arise from the fact that the sheath, in the protrusion step, is resiliently axially compressed. Being under compression, the sheath has a tendency to return to its normal position covering the end of the core. There is, moreover, only a weak mechanical connection between the sheath and the core, so that in some instances the attainment of the protrusion of an adequate length of bared core is difficult. Accordingly, it has been found desirable to utilize certain special structural arrangements to achieve proper initial protrusion of the core and to ensure that it remains protruded. The sheath must be engaged in such a way as to effectively restrain its forward axial movement, both during and after insertion of the wire, without restraining to any appreciable degree the forward axial movement of the core. Several different structural embodiments are here illustrated which satisfy these requirements.

A significant feature of the preferred embodiment of our present invention is that it is foolproof, that is to say, if the wire remains in the terminal after being inserted, if it cannot be pulled out therefrom, then the user knows that adequate electrical connection with the wire core has been achieved.

Several novel arrangements for the removal of wire from the terminals of the present invention are also here disclosed. When a conventional prior art binding screw is employed in a terminal it is always necessary that the binding screw be unscrewed before the stripped wire can be removed. Recently various types of non-binding-screw terminals have been devised. In these terminals the core must be bared before insertion and it is then gripped by a tooth or the like. A tool must be inserted into the terminal to move the tooth to released position before the wire can be removed, or else special release structure must be built into the terminal. In these embodiments of the present invention where a resiliently mounted tooth is employed to grip the bared core it is possible to use such a tool or built-in structure for wire-release purposes, and certain novel and advantageous arrangements to that end are here disclosed. Attention is called particularly, however, to the elimination of the necessity for employing such a tool by providing the tooth with a core-engaging edge which is skewed with respect to the core, either being inclined relative to the axis thereof or being vertically inclined relative thereto. As a result of the skew, the wire may be removed without having to employ tools by cutting off the end of the wire and then rotating the wire about its axis in an appropriate direction, the skewed core-engaging edge engaging the core in such a manner that the core may be screwed out.

Other advantages of the terminal structures of the present invention are that they resist corrosion by providing an insulating covering for the engaging conducting surfaces, that they are vibration proof and jostle proof, that a better electrical contact is made than is accomplished either by a binding screw terminal or the non-binding screw terminals available on the market, and that no current carrying parts of the terminal are exposed.

The terminal of the present invention can be used in place of prior art terminals on virtually every type and size of electrical connector for stiff core wires as well as, in many cases, on stranded core wires. Thus, for example, it may be employed in receptacles, switches, wire nuts, solderless lugs, terminal blocks and the like for solid core wires and solderless connectors, lugs, terminal bars, splicers and the like for stranded core wires.

To the accomplishment of the above, and to such other further objects as may hereinafter appear, the present invention relates to the construction of wire terminals as defined in the appended claims and as described in this specification, taken together with the accompanying drawings, in which:

Figure 1:
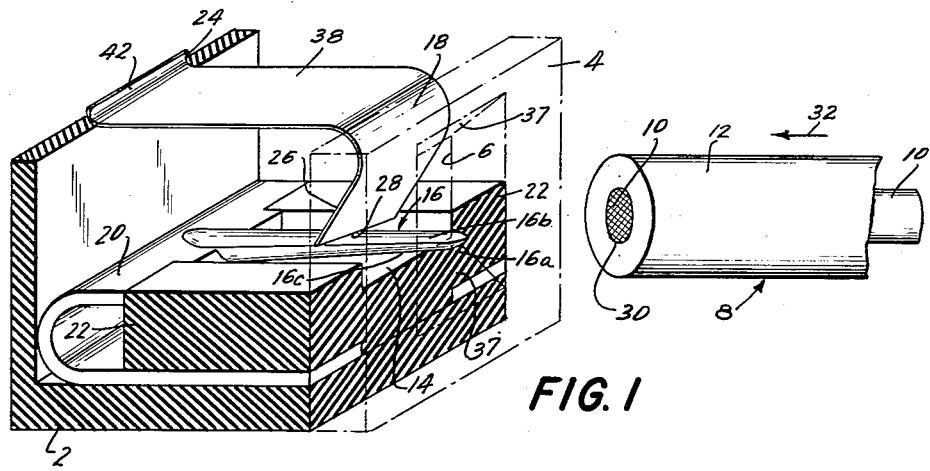
FIG. 1 is a three-quarter perspective view, partially broken away and partially in phantom, showing a preferred embodiment of the present invention in idealized or semi-schematic form, the unstripped wire being in position to be inserted thereinto, the embodiment of FIG. 1 utilizing both the "sword principle" and the "protrusion principle"

FIGS. 1–5 illustrate in semi-schematic manner a preferred form of the present invention which utilizes a sword and attains protrusion of the wire core. The terminal comprises a housing 2 formed of any suitable insulating material and having a front wall 4 (shown in phantom) with an opening 6 through which the wire generally designated 8 is adapted to be inserted. This wire may comprise a comparatively stiff conductive core 10 covered by an insulating sheath 12 which is usually of rubbery material and therefore is somewhat resiliently compressible. As has been mentioned, in wires of this type available on the market the insulating sheath 12 is not bonded to the conductive core 10, but is instead readily axially slidable relative thereto.

Within the housing 2, and in line with the opening 6, is a floor 14, a prong or sword 16, and a resilient core-engaging tooth 18, arranged vertically in the order named. The sword 16 is mounted on an element 20 at the rear or inner end of the housing 2, that element 20 preferably being resilient so that some vertical play of the sword 16 is permitted. Spacing blocks 22 effectively inhibit any lateral movability of the sword 16. The core-engaging tooth 18 is formed of resilient material and is mounted in cantilever fashion within the housing 2 at 24 so as to extend directly beneath the housing top wall 40 toward the opening 6 and then is reversely and downwardly bent so as to define an inwardly and downwardly inclined portion 26 terminating in a core-engaging edge 28 which is located above the sword 16 and inwardly of the front edge of the floor 14.

In use the wire 8 is aligned with the opening 6 so that the tip of the sword 16 rests against the lower portion of the junction 30 between the wire core 10 and the insulation sheath 12. The wire is then pushed inwardly, in the direction of the arrow 32 of FIG. 1, so that the sword slips between the insulation 12 and the core 10, the insulation sheath 12 stretching in an accommodating manner. The further into the housing 2 the wire 8 is pushed, the further up the sword 16 does the wire ride. It will be noted that the sheath 12 covers the sword 16 and the core 10, so that the wire remains insulated and so that the contact surface between the sword 16 and the wire 10 remains covered and protected from adverse external influences. Moreover, the stretching of the sheath 12 develops a resilient force which tends to press the sword 16 and core 10 tightly against one another. As a result there is an extensive and protected contact surface developed between the core 10 and sword 16, so that it is entirely feasible, and often desirable, to form the sword 16 of electrically conductive material and provide means for electrically connecting it to some other element or circuit, the actual electrical connection between the terminal and the core 10 thus being accomplished by means of the sword 16.

The core-engaging edge 28 of the tooth 18 is positioned inwardly of the tip of the sword 16 and inwardly of the forward edge of the floor 14. As the wire 8 is moved further inwardly into the housing 2 the portion 26 of the tooth 8 will be engaged either by the tip of the wire 8 or, preferably, by the insulation sheath 12, resulting in a movement of portion 26 of the tooth (in a clockwise direction as viewed in FIG. 1), thus permitting the core 10 to continue to move inwardly into the housing 2. However, the outward pressure exerted by the tooth portion 26 on the sheath, either alone or in conjunction with the interaction of the sheath 12 and sword 16, will be effective on the sheath 12 so as to restrain further inward movement thereof. As a result the core 10 will protrude from the end of the sheath 12.

After such protrusion has been accomplished, the wire 8 is released. The tooth portion 26 tends to swing downwardly and outwardly (in a counter-clockwise direction as viewed in FIG. 1), and its core-engaging edge 28 grips into the protruding bared core 10. The tooth 18 is preferably formed of spring steel, is therefore considerably harder than the wire core 10, and consequently bites into that core. Moreover, the action of the tooth portion 26 presses the core 10 against the sword 16, the latter thus "backing up" the action of the tooth portion 26. Any outward pull on the wire 8 will only cause the tooth portion 26 to bite more deeply into the core 10. Moreover, since the presence of the core 10, interposed between the sword 16 and the tooth portion 26, prevents the tooth portion 26 from swinging back completely to rest position, constant spring tension force is maintained on the core 10 pressing it tightly against the sword 16. Where, as in the construction shown in FIG. 1, the sword is the electrically conductive member, the tooth is positioned far enough inward from the sword tip so that sufficient surface and volume engagement between the sword and the core of an inserted wire for adequate electrical contact is achieved before core protrusion takes place.

It will be seen from the above description that observation of the interior of the housing 2 is not required in order to ascertain whether effective electrical connection has been made. All that the operator need do, after he has inserted the wire 8, is to attempt to pull it out. If it comes out, that will indicate that there was not sufficient electrical contact between the core 10 and the sword 16, and he can try again. If the wire 8 will not come out, then the operator knows that proper electrical connection has been achieved.

Figure 3:
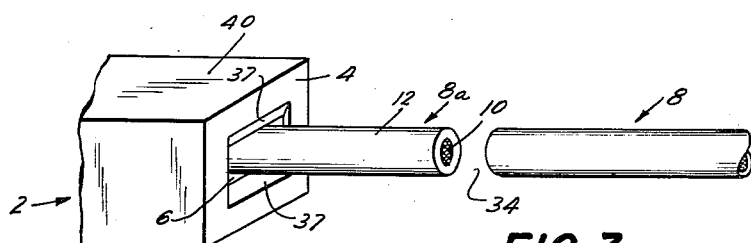
FIG. 3 is a three-quarter perspective view showing the initial step in the removal of a wire from the terminal of FIG. 1.
Figure 4:
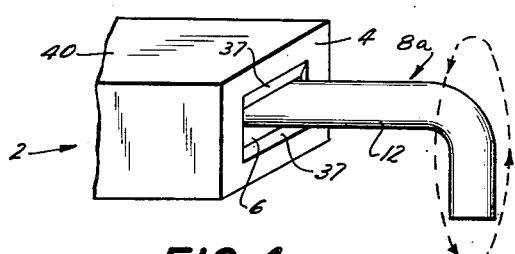
FIG. 4 illustrates the subsequent unscrewing step in the removal of the wire end.
Figure 5:
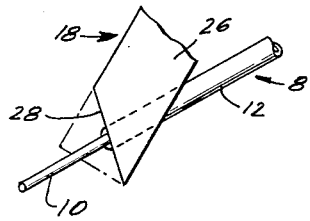
FIGS. 5 and 6 are three-quarter perspective views of two different embodiments of core-engaging teeth which are skewed with respect to the core.
Figure 6:
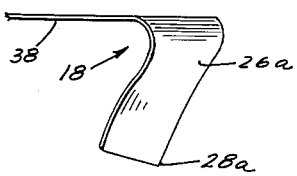

In the preferred form here disclosed the wire 8 may be disconnected from the terminal by snipping off a stub 8a at the end thereof, as at 34 in FIG. 3, and then rotating the wire 8 in an unscrewing direction, as shown in FIG. 4. When this is done the wire stub 8a will unscrew from the terminal after a relatively few turns. This occurs because the core-engaging edge 28 of the tooth 18 is so configured that it makes a skew-engagement with the core 10. As shown in FIG. 5, this skew-engagement may be realized by inclining the edge 28 relative to the floor 14 or, as shown in FIG. 6, the edge 28a may be parallel to the floor 14 but the tooth portion 26a may be twisted so that the edge 28a is not perpendicular to the axis of the core 10. An alternative arrangement is to utilize a tooth 18 the edge of which is normally both perpendicular to the axis of the core 10 and parallel to the floor 14, but to permit the tooth portion 26 an appreciable degree of side play. With such an arrangement rotation of the wire stub 8a will itself twist the tooth portion 26 to one side or the other and this will in turn cause the core-engaging edge 28 to become skewed with respect to the core 10. It will be understood, of course, that, if desired, a tool could be inserted through the aperture 6, or through any other aperture suitably provided, to permit manual movement of the tooth portion 26 to a position such that it will release the core 10.

Figure 13:
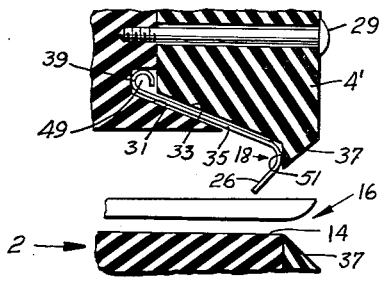
FIG. 13 is a cross sectional schematic view illustrating a novel screw arrangement for releasing a conductor which has been inserted into the terminal, the parts being shown in conductor-engaging position.
Figure 14:
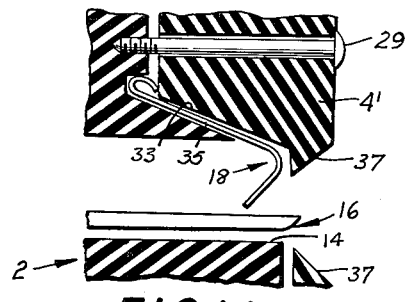
FIG. 14 is a view similar to FIG. 13 but with the parts shown in conductor-releasing position.

Alternatively, release mechanism can be built into the terminal. One novel type of such release mechanism is shown in FIGS. 13 and 14. There the front portion 4' of the terminal is connected to the terminal proper by a screw 29, the facing surfaces 31 and 33 of the housing proper 2 and the front portion 4' thereof being inclined and receiving therebetween the portion 35 of the tooth 18. The inner end 39 of the tooth 18 is received within a recess 49 defined between the housing 2 and its front portion 4', and the inwardly and downwardly inclined tooth portion 26 is backed up by a ledge 51 forming a part of the front housing portion 4'. When, as is shown in FIG. 13, the screw 29 is screwed in, thus moving the front housing portion 4' to the left, the tooth 18 will be engaged and held in core-engaging position. However, as may be seen in FIG. 14, if the screw 29 is screwed out the front housing portion 4' is moved to the right, thus opening a space between its inclined surface 33 and the tooth part 35. Because of the resiliency of the tooth it will retain itself in its core-engaging position, but if an outward pull should be exerted on the wire to which it is connected it will, by reason of the outward movement of the housing portion 4', be free to pivot in a counter-clockwise direction as viewed in FIG. 14, thus permitting the wire to be removed. It will be noted that the partial screwing out of the screw 29, and hence the moving of the housing portion 4' to unlocking position, does not release the wire, but only makes the wire susceptible to release provided it is pulled out with an appreciable amount of force. This attribute is particularly advantageous when this arrangement is employed in a multiple connector of the type shown in FIGS. 15 and 16. There a single screw 29 controls the position of the front housing portion 4' which is provided with a plurality of apertures 6, here shown as four in number, through which wires can be inserted. Unscrewing of the screw 29 permits the portions 26 of all four of the core-engaging teeth 18 to be capable of moving to a core-releasing position. However, when the screw 29 is thus manipulated in order to remove a single selected wire from the multiple terminal, the other wires will remain in place (unless they are manually pulled out). A particular feature of the arrangement of FIGS. 13–16 is that a wire can be inserted into the terminal when the screw 29 is either in its releasing or locking position.

Returning now to the broader aspects of the terminal of FIG. 1, it will be noted that for best results the sword 16 should be positioned above the floor 14 by a distance which is at least slightly greater than the maximum thickness of the insulation sheath 12 of the wires to be used with the particular terminal in question. This is desirable in order that there may be sufficient clearance provided between the bottom of the sword 16 and the floor 14 to permit the sword 16 to slide freely between the core 10 and the insulation sheath 12. Any hindrance to such movement would make it more difficult to push the wire up the sword 16, would cause premature core protrusion, and would make removal of the wire difficult. The primary disadvantage of premature core protrusion arises from the fact that there is little frictional connection between the sheath 12 and the core 10. It is preferably primarily the sheath 12 which serves to swing the tooth portion 26 inwardly and upwardly, and it is preferred that this be done before the core 10 ever engages the tooth portion 26, since the resistance of the tooth portion 26 to such swinging would, if it were engaged by the core 10, often result merely in preventing the core 10 from protruding inwardly beyond the tooth edge 28. The specified spacing between the floor 14 and the sword 16 will also facilitate proper alignment of the wire 8 with respect to the tip of the sword 16 when the wire is inserted.

Figure 8:
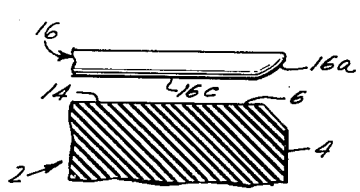
FIG. 8 is an elevational view showing the preferred configuration of the tip of the sword.

As will be noted particularly from FIG. 8, the tip of the sword 16 is preferably comparatively blunt, and the surface 16a thereof slopes inwardly and downwardly from the tip. By making the tip blunt we prevent the tip from sticking into or cutting the insulation sheath 12. The function of the sword tip is to peel the sheath 12 away from the core 10 and facilitates the entry of the sword 16 between the sheath and the core. The angularity of the surface 16a causes a self-aligning operation as between the wire 8 and the sword 16.

Figure 7:
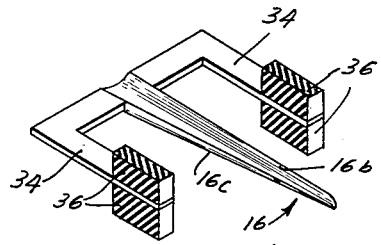
FIG. 7 is a three-quarter perspective view showing an alternative method of mounting the sword.

Mention has been made of the fact that the sword 16 is preferably mounted in such a way as to have a degree of vertical movement. FIG. 7 illustrates a mounting arrangement for the sword 16 alternative to that shown in FIG. 1 and also permitting this type of movability.

The sword 16 in FIG. 7 is suspended by a pair of L-shaped arms 34 the free ends of which are clamped between blocks 36. Because of the clamping of these arms 34 the sword 16 is not readily laterally movable but is permitted a degree of resilient movement in a vertical direction.

This movement capability is desired to ensure the repeated useability of the terminal. When the tooth 18 engages and bites into a wire core 10 there is an appreciable component of force that tends to press the core 10 downwardly against the floor 14, and the more strongly the wire 8 is pulled outwardly, the greater is this force. If the core 10 is permitted to move downwardly away from the tooth part 26 it may escape therefrom and the wire will not be retained in the terminal. Accordingly, when the tooth 18 bites into the protruded core 10 there must be some means for holding the core in engagement therewith. The sword 16, together with the floor 14 against which the bottom surface of the insulation sheath 12 engages (see FIG. 2), perform this function.

Normally the presence of the insulation sheath 12 beneath the sword 16 prevents the latter from being bent downwardly by the action of the tooth 18 to an excessive degree. However, when the wire is being unscrewed from the terminal there may come a time when the insulating sheath 12 has moved outwardly beyond the forward edge of the floor 14 but the bared core 10 is still engaged by the tooth surface 28. When this occurs the action of the tooth 18 on the core 10 may move the sword 16 downwardly until the latter engages the floor 14. Hence it will be apparent that the sword 16 must be supported in a sufficiently resilient manner so that, when a wire is removed from the terminal, the sword 16 will not be given a permanent bend or inclination which will inhibit or prevent further use of the terminal.

The use of a flexible suspension system for the sword 16 has the further advantages that it makes it much easier for a wire to align itself properly on the sword 16, the resilient pressure on the stretched insulation sheath 12 becoming active upon the sword 16 to move it vertically to proper alignment position with the wire, and that the electrical engagement between the sword 16 and the core 10 will be firm and reliable even if the terminal is subjected to extreme degrees of vibration.

It is preferred, and it is here specifically disclosed, that the upper surface 16b of the sword be concave, and that the lower surface 16c thereof be convex, the better to conform to the outer surface of the core 10 and the inner surface of the insulation sheath 12 respectively during insertion of the wire. The convexity of the lower sword surface 16c is further desirable since it permits the sheath 12 to rotate readily around the sword when the wire is being unscrewed for removal, and in such an operation the concavity of the upper sword surface 16b serves to prevent the core 10 from rolling off the sword 16 as the core 10 rotates during the unscrewing process. The sword could, however, take many different forms, ranging from a flat blade to a cylinder within which the core 10 is received.

It is preferred that the tip of the sword 16 be readily visible through the opening 6 in the housing front wall 4. To this end, as may best be seen in FIGS. 1 and 2, the tip of the sword not only extends at least partway into that opening 6, but the upper and lower portions of the front wall 4 are bevelled inwardly, as at 37. Visibility of the sword tip 16 is desirable in order to facilitate at least approximate initial alignment of the wire 8 at the time of insertion. With the end of the wire 8 and the tip of the sword 16 both in sight, and with the sword tip designed and shaped, through its blunt tip, its inclined surface 16a and its curved surfaces 16b and 16c, to facilitate accurate final alignment of the sword and wire, the insertion of a wire into the terminal so that the sword 16 will properly penetrate between the core 10 and the insulation sheath 12 becomes a very simple manipulative matter. This is so even when the terminal is designed for use with a plurality of gauges of wire, the opening 6 then necessarily being large enough to permit entry of the largest wire gauge desired and thus providing for clearance in the event that one of the smaller gauges of wire is actually employed.

The effectiveness of the electrical connection achieved in the terminal under discussion will be apparent. The amount of actual surface contact between the core 10 and the conductive sword 16 is comparable to the cross sectional area of the core 10 itself, the volume of the current carrying sword 16 in contact with the core 10 may be of the same order of magnitude as that of the core 10, and there is an appreciable force constantly tending to keep the core 10 and the sword 16 pressed tightly together.

Moreover, the wire and sword, particularly when the latter is tapered, as is specifically shown, cooperate so as to compensate for differences in the gauge of the wire. The larger the wire the greater should be the area of contact between the wire and the terminal. The larger the wire, the farther can the wire be pushed along the tapered sword 16 before the insulation sheath 12 is so stretched that it will not permit the wire to slide any further on the sword therealong. Core protrusion will occur if the wire is pushed inwardly beyond this point. Hence the larger the wire the greater is the amount of core 10 that will be touching the sword 16 before protrusion of the core 10 from the sheath 12 begins. Moreover, since it is the sheath 12 and not the core 10 which preferably primarily swings the tooth part 26 inwardly, this means that the tooth part 26 will be swung inwardly more and sooner for a larger wire than a small wire, and this, in turn, means that the tooth surface 28 will be moved upwardly a greater distance for a large wire than a small wire. This produces vertical clearance between the core 10 and the tooth edge 28, permitting the core 10 to protrude without material restriction from the tooth part 26. Nevertheless, the core-engaging edge is close enough to the upper surface of the exposed protruded core portion 10 so that when inward pressure on the wire 8 is released the tooth part 26 will swing back and bite into the protruded core 10.

It will further be noted that the fact that the tooth 18 bites into the core 10 is an almost foolproof assurance that proper electrical contact has been made. After inserting a wire 8, the operator may pull outwardly on the wire 8. If it comes out, adequate electrical connection has not been made. If it does not come out, adequate electrical connection has been made.

The basic purpose of the floor 14 is to provide a comparatively unyielding surface to support the core 10 when the tooth 18 bites thereinto. The particular shape of the floor 14 is not at all critical. It may be flat, as shown in FIG. 1, or it may be curved to conform more or less to the outer shape of the wire 8. It should, however, be spaced sufficiently from the sword 16 to permit the easy entrance of the insulation sheath 12 therebetween, but not so far below the sword 16 that the action of the tooth part 26 on the sword 16 via a bared wire core 10 can bend the sword 16 beyond its elastic limit. The floor 14 is usually made of insulating material, although that, too, is not essential.

Figure 2:
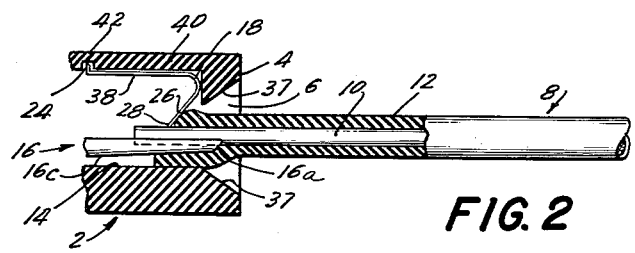
FIG. 2 is a vertical cross sectional schematic view showing the embodiment of FIG. 1 when the wire has been inserted.

With respect to the tooth 18, it is preferably made of some substance harder than the wire core 10 so that its edge 28 can bite into the core 10, although, if desired, only that portion of the tooth 18 adjacent the edge 28 need be of such material. The tooth 18 should be resiliently mounted, and should have an elastic resiliency sufficient so that movement of the tooth part 26 in a clockwise direction even with the largest gauge of wire to be used in the terminal will not exceed the elastic limit thereof. Moreover, the tooth must be supported in such a way that the core-engaging edge 28 thereof cannot move away from the core 10 under wire pull-out stress. It is for this reason that, in FIG. 1, the tooth part 26 is connected to an inwardly extending length 38 which, as shown in FIG. 2, extends along the underside of the upper wall 40 of the housing 2 and is secured to the housing 2, as at 24.

Figure 9:
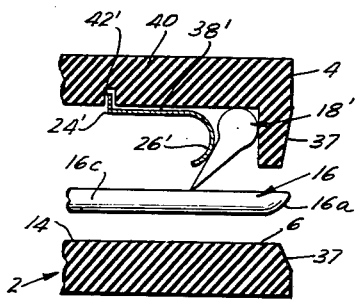
FIG. 9 is a schematic view similar to FIG. 2 but showing an alternative mounting and construction for the core-engaging tooth.

An alternative tooth arrangement is disclosed in FIG. 9. There the tooth 18' is itself rigid and is pivotally mounted in the housing 2, being urged in a counter-clockwise direction by spring part 26' which connects with the spring part 38' extending along the underside of the housing top wall 40 and connected to the housing top wall at 42'.

Figures 10, 11:
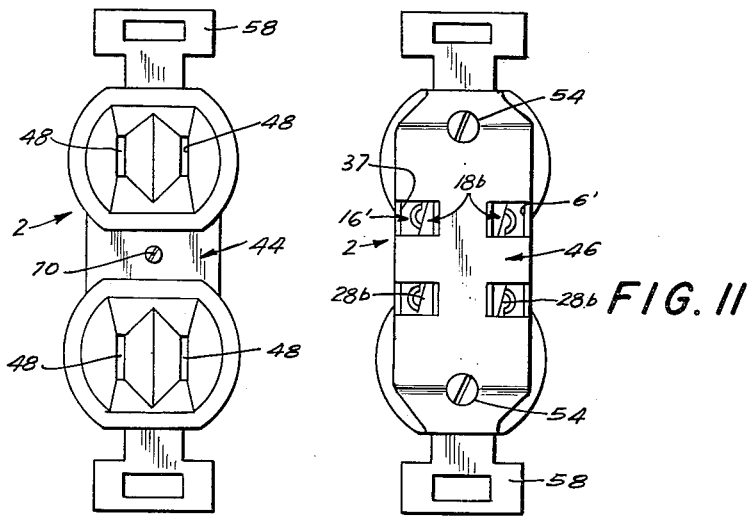
FIG. 10 is a front elevational view of a representative plug-in receptacle embodying a terminal operating on the principles of the terminal of FIG. 1.
FIG. 11 is a rear elevational view thereof.
Figure 12:
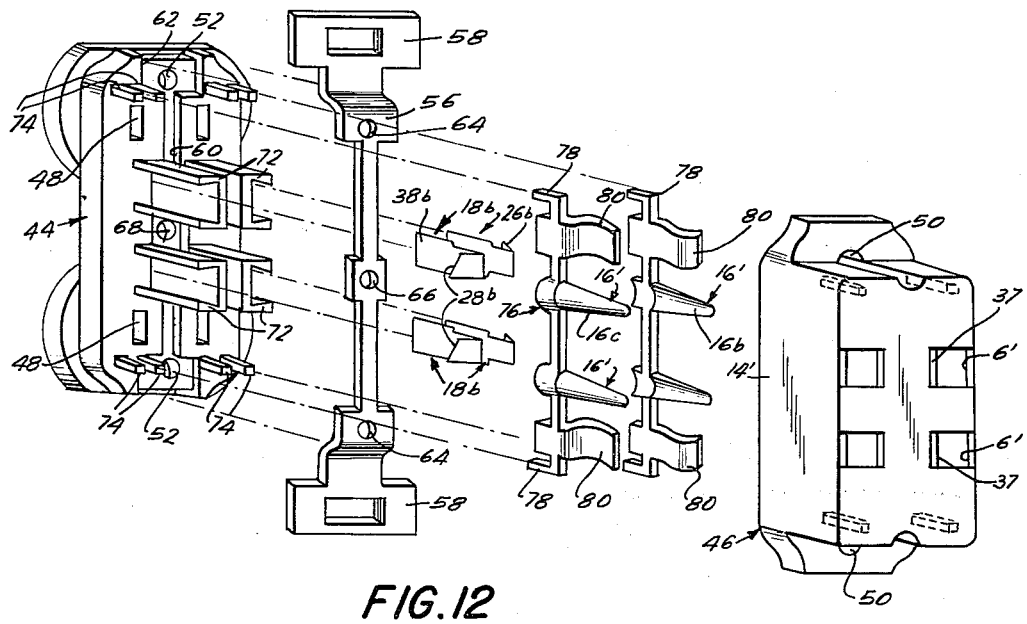
FIG. 12 is a three-quarter perspective exploded view thereof.
Figure 15:
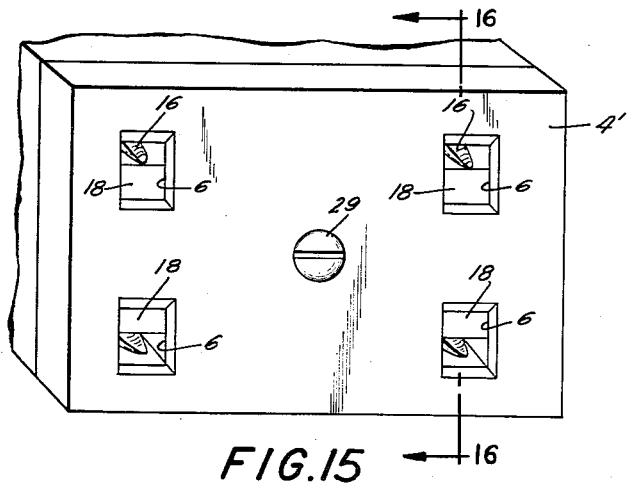
FIG. 15 is a three-quarter rear perspective view of a multiple connector utilizing a release structure of the type shown in FIGS. 13 and 14 and in which a single control element is effective for the plurality of conductor-receiving terminals.
Figure 16:
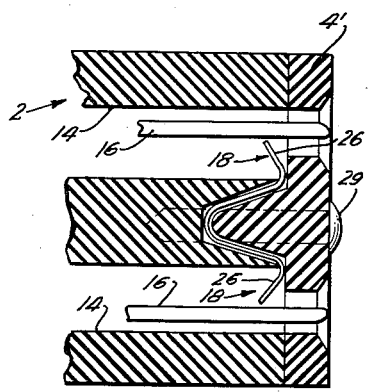
FIG. 16 is a cross sectional view taken along the line 16—16 of FIG. 15.

FIGS. 10–12 illustrate a representative wall plug receptacle embodying the principles of the terminal of FIG. 1. The housing 2 is defined by a front member 44 and a rear member 46. The front member 44 is provided with elongated openings 48 through which the prongs of a conventional plug are adapted to pass. The rear member 46 is hollow and is provided with a plurality of apertures 6' through which wires 8 are adapted to be inserted. Screw holes 50 are provided at each end adapted to register with tapped holes 52 in the front member 44 so that screws 54 can retain the two members 44 and 46 in assembled condition. A mounting strip 56 is secured between the members 44 and 46 and has end portions 58 extending from either end of the receptacle assembly so that the receptacle may be mounted in position thereby. Recesses 60 and 62 are provided on the inner face of the member 44 within which the mounting strip 56 is received, the screws 54 pass through apertures 64, and the central portion of the mounting strip 56 is provided with a threaded screw hole 66 registering with a corresponding aperture 68 in the front member 44 through which screw 70 is adapted to pass.

Projecting from the inner surface of the front member 44 are a plurality of channel-shaped elements 72 within which the core-gripping teeth 18b are adapted to be received, those teeth comprising portions 38b snugly received within the channels 72 and integral and reversely bent portions 26b terminating in skewed core-engaging edges 28b.

Also projecting from the inner face of the front member 44 are pairs of posts 74 the spaces between which are substantially in line with the plug-receiving openings. Terminal strips 76 are provided, formed of suitable conducting material. They comprise legs 78 adapted to be received between the posts 74, thus serving to mount the strip 76 in position. They carry broad resilient blades 80 located in line with the openings 48 and adapted to make electrical connection with the prongs of the plugs adapted to be inserted into the terminals. They also carry swords 16' which are positioned opposite the channels in the elements 72. The side walls of the rear member 46 define the floors 14b for the various terminals. By inserting wires 8 into the openings 6' in the manner described in connection with FIG. 1, electrical connection will be made between the wires and the respective conductive strips 76 via the swords 16' which they carry, and through those strips to the blades 80 with which the prongs of plugs are adapted to cooperate.

In addition to the advantages previously set forth, certain other desirable features of the terminals as thus far described should be mentioned. These terminals take up less space than any other known non-binding screw type terminal. The skewed nature of the core-engaging tooth edges 28, which eliminates the necessity for providing means by which the tooth 18 may be manually released from the core 10 when the wire is to be removed from the terminal, materially contributes to this desirable result. The terminal is also extremely inexpensive, since the only parts thereof which need be specially fabricated are the sword 16 and the tooth 18. Indeed, as is apparent from FIGS. 10–12, the sword 16 itself need not be made as a separate piece, for the brass from which the contact system (the strip 76) is made can provide the required springiness.

It will be apparent from the above that the terminals of the present invention are simple, inexpensive, compact, and extremely reliable. It will further be apparent that they are much more convenient to use than any other known terminal, since the wire need not be stripped before being inserted thereinto. Electrical connection is most satisfactory, particularly where the sword 16 is employed, the wire is reliably clamped and maintained within the terminal when it is properly inserted, and when a skewed core-engaging edge 28 is employed, the wire may be removed from the terminal without having to use any tools and without having to build any special release mechanism into the terminal.

It will be apparent that many variations may be made in the specific designs and constructions here disclosed. Purely by way of example, the device for gripping the wire, here illustrated predominantly in the form of an inclined tooth, could take any one of a number of alternative forms, for instance utilizing a wedging or sliding action instead of a swinging action. Electrical connection to the wire could be made via the tooth 18, sword 16 or floor 14. Many other variations will suggest themselves which embody the principles of the present invention, the essence of which is defined in the following claims.

We claim:

1. A terminal comprising a floor over which an insulated wire is adapted to be moved inwardly, a prong supported above said floor and extending outwardly, said prong being adapted to engage said wire between the core and the insulation thereon, and a tooth resiliently mounted over said prong, extending generally theretoward, and inclined inwardly, said tooth having a surface located inwardly of the tip of said prong and normally spaced therefrom by a distance less than the thickness of said wire core and adapted to engage said wire core when said wire is engaged by said prong and said wire core is projected beyond the wire insulation and thereby retain said wire in prong-engaged condition.

2. A terminal comprising a floor over which an insulated wire is adapted to be moved inwardly, a prong supported above said floor and extending outwardly, said prong being adapted to engage said wire between the core and the insulation thereon, and a tooth resiliently mounted over said prong, extending generally theretoward, and inclined inwardly, said tooth having a surface located inwardly of the tip of said prong and normally spaced therefrom by a distance less than the thickness of said wire core and adapted to engage said wire core when said wire is engaged by said prong and said wire core is projected beyond the wire insulation and thereby retain said wire in prong-engaged condition, one of said tooth and said prong being conductive.

3. The terminal of claim 1, in which said prong is movable within limits toward and away from said floor.

4. The terminal of claim 1, in which the extending tip of said prong has a lower surface extending from the extremity of said tip downwardly toward said floor and inwardly.

5. The terminal of claim 1, in which the extending tip of said prong is somewhat blunt and has a lower surface extending from the extremity of said tip downwardly toward said floor and inwardly.

6. The terminal of claim 1, in which the lower surface of said prong, opposite said floor, is convex.

7. The terminal of claim 1, in which the upper surface of said prong is concave and the lower surface of said prong, opposite said floor, is convex.

8. The terminal of claim 1, in which said prong is supported in cantilever fashion at a point inwardly spaced from said wire-engaging surface of said tooth.

9. In the terminal of claim 1, a housing within which said floor, prong and tooth are contained, said housing having an opening substantially in line with the tip of said prong through which said wire is adapted to be passed, said prong tip being so located as to be visible through said opening from the exterior of said housing.

10. The terminal of claim 1, in which the wire-engaging surface of said tooth is adapted to engage said wire along a line making an angle other than a right angle with the axis of said wire.

11. The terminal of claim 1, in which said terminal is adapted to be used with insulated wires the thickness of the insulation of which is to be within a given range, said prong being normally spaced above said floor by a distance slightly greater than the maximum thickness of said insulation and being movable within limits toward said floor.

12. The terminal of claim 1, in which the wire-engaging surface of said tooth is adapted to engage said wire along a line making an angle other than a right angle with a plane parallel to said floor.

References Cited in the file of this patent

UNITED STATES PATENTS

| | | |
|---|---|---|
| 1,376,401 | Claytor | May 3, 1921 |
| 1,926,163 | Mohr | Sept. 12, 1933 |
| 2,035,947 | Davis | Mar. 31, 1936 |
| 2,617,844 | Sanda | Nov. 11, 1952 |
| 2,675,531 | Sams et al. | Apr. 13, 1954 |
| 2,705,785 | Benander | Apr. 5, 1955 |
| 2,705,787 | Benander | Apr. 5, 1955 |
| 2,825,040 | Dorsey | Feb. 25, 1958 |